(12) United States Patent
Zuo et al.

(10) Patent No.: US 11,445,853 B2
(45) Date of Patent: Sep. 20, 2022

(54) REFRIGERATOR

(71) Applicant: QINGDAO HAIER JOINT STOCK CO., LTD., Qingdao (CN)

(72) Inventors: Lihua Zuo, Qingdao (CN); Yanqing Zhang, Qingdao (CN); Weishou Sun, Qingdao (CN); Jianjun Xue, Qingdao (CN); Chuan Cui, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 506 days.

(21) Appl. No.: 16/605,499

(22) PCT Filed: Oct. 12, 2018

(86) PCT No.: PCT/CN2018/109974
§ 371 (c)(1),
(2) Date: Oct. 15, 2019

(87) PCT Pub. No.: WO2019/072228
PCT Pub. Date: Apr. 18, 2019

(65) Prior Publication Data
US 2020/0121121 A1 Apr. 23, 2020

(30) Foreign Application Priority Data
Oct. 13, 2017 (CN) .......................... 201710951935.1

(51) Int. Cl.
*A47J 31/40* (2006.01)
*A47J 31/46* (2006.01)
(Continued)

(52) U.S. Cl.
CPC .......... *A47J 31/468* (2018.08); *A47J 31/407* (2013.01); *A47J 31/5255* (2018.08);
(Continued)

(58) Field of Classification Search
CPC ................ A47J 31/5255; A47J 31/3623; A47J 31/3676; A47J 31/407
(Continued)

(56) References Cited

U.S. PATENT DOCUMENTS

2009/0293735 A1* 12/2009 Van Dillen ......... A47J 31/0668
222/1
2012/0102999 A1* 5/2012 Anselmino ............. A47J 31/06
222/1
(Continued)

FOREIGN PATENT DOCUMENTS

CN 2539113 Y 3/2003
CN 106196829 A 12/2016
(Continued)

*Primary Examiner* — Reginald Alexander
(74) *Attorney, Agent, or Firm* — Cheng-Ju Chiang

(57) ABSTRACT

The present invention discloses a refrigerator, comprising a cabinet, a door and a water dispenser, wherein the water dispenser comprises a water tank, a drain path, a beverage making chamber and a dispenser, the beverage making chamber is communicated with the dispenser, the water dispenser further comprises an integration module provided between the water tank and the beverage making chamber, and the integration module comprises any one, two or all of the flow meter, the water pump and the heater. The refrigerator with the integration module may heat, pressurize the beverage and/or adjust the concentration of the beverage when the beverage is prepared, so that the user may make beverages of various flavors as required, and the diversification of drinking functions of the refrigerator is realized.

8 Claims, 8 Drawing Sheets

(51) Int. Cl.
  *A47J 31/54* (2006.01)
  *A47J 31/56* (2006.01)
  *F25D 31/00* (2006.01)
  *A47J 31/52* (2006.01)
  *A47J 31/36* (2006.01)

(52) U.S. Cl.
  CPC ............ *A47J 31/542* (2013.01); *A47J 31/56* (2013.01); *F25D 31/002* (2013.01); *A47J 31/3623* (2013.01)

(58) Field of Classification Search
  USPC .......................................................... 99/290
  See application file for complete search history.

(56) References Cited

U.S. PATENT DOCUMENTS

| | | | |
|---|---|---|---|
| 2014/0037794 A1* | 2/2014 | Patera | A47J 31/407 426/66 |
| 2015/0101670 A1* | 4/2015 | Bird | A47J 31/465 137/334 |
| 2016/0058242 A1* | 3/2016 | Viet-Doan | B65D 81/02 99/283 |
| 2017/0057803 A1 | 3/2017 | McKinney | |
| 2018/0299190 A1* | 10/2018 | Sakthivel | B67D 1/0888 |

FOREIGN PATENT DOCUMENTS

| | | |
|---|---|---|
| CN | 107744339 A | 3/2018 |
| CN | 107917573 A | 4/2018 |
| CN | 107928408 A | 4/2018 |
| CN | 107928409 A | 4/2018 |
| EP | 1832826 A2 | 9/2007 |

\* cited by examiner

REFRIGERATOR

The present application is a 35 U.S.C. § 371 National Phase conversion of International (PCT) Patent Application No. PCT/CN2018/109974, filed on Oct. 12, 2018, which claims priority to Chinese Patent Application No. 201710951935.1, entitled "refrigerator", filed on Oct. 13, 2017, the disclosure of which is incorporated herein by reference in its entirety. The PCT International Patent Application was filed and published in Chinese.

TECHNICAL FIELD

The present invention relates to the field of refrigeration equipment, and in particularly, to a refrigerator with a water dispenser.

BACKGROUND

On the one hand, with the acceleration of urbanization, a refrigerator has found its way into huge numbers of families and becomes an essential household appliance. Currently, novel and fashionable multi-function refrigerators gain the popularity amount more and more well-off families. On the other hand, with the accelerating pace of life, more and more young people like coffee, and offices, airports, hotels and the like places have equipped with automatic coffee makers.

However, most of the products currently on the market are traditional refrigerators only with refrigeration functions. Few refrigerators have the function of producing hot water, not to mention the functions of making beverages, such as coffee, tea, or the like.

In view of this, it is necessary to provide a new refrigerator to solve the above-mentioned problems.

SUMMARY

An object of the present invention is to provide a new refrigerator to meet the increasingly diverse drinking demands from users, and to solve the problem that the current refrigerator has a single function.

In order to achieve the above-mentioned object, the present invention adopts the following technical solution: a refrigerator, including a water dispenser, the water dispenser including:

a water tank, connected with an external water source, for storing and supplying drinking water;

a drain pipeline, connected with the water tank;

a beverage making chamber, provided at one end of the drain pipeline away from the water tank, in which a capsule support for receiving a beverage powder capsule and a capsule piercing structure for puncturing the capsule operatively are provided;

a dispenser, provided on a door of the refrigerator and communicated with an outlet of the beverage making chamber, including a beverage outlet, from which the prepared beverage flows.

As a further improved technical solution of the present invention, the water dispenser further includes a heater provided between the water tank and the beverage making chamber, to allow heated drinking water to flow into the beverage making chamber.

As a further improved technical solution of the present invention, the water dispenser further includes a first selector, provided between the heater and the beverage making chamber, for selectively controlling the water heated by the heater either to be introduced into the beverage making chamber, or to directly flow out of a hot water outlet provided at the dispenser.

As a further improved technical solution of the present invention, the water dispenser further includes a water pump provided between the water tank and the heater, for pressurizing the drinking water.

As a further improved technical solution of the present invention, the water dispenser further includes a second selector, connected between the water pump and the heater, for selectively controlling the water pressurized by the water pump either to be introduced directly into the beverage making chamber, or to be introduced into the heater.

As a further improved technical solution of the present invention, the water dispenser further includes a flow meter communicating the water tank with the beverage making chamber, for controlling an amount of drinking water flowing into the beverage making chamber.

As a further improved technical solution of the present invention, the water dispenser includes a water tank, a flow meter, a water pump, a heater, a beverage making chamber, and a dispenser with a beverage outlet, which are sequentially connected by a water pipe, and the water dispenser is provided on the door of the refrigerator.

As a further improvement of the technical solution of the present invention, the dispenser is provided thereon with a user interface and a controller, wherein the user interface is configured to receive demand information of a user and generate a representative signal of the demand information, and the controller controls the water dispenser according to the representative signal.

As a further improved technical solution of the present invention, the demand information includes beverage concentration information, and the controller controls the flow meter to be ON and OFF according to the representative signal of the concentration information.

As a further improved technical solution of the present invention, the water dispenser further includes a second selector connected between the water pump and the heater, and the demand information includes a selection instruction of a beverage making temperature. According to the representative signal of the selection instruction, the controller controls the second selector to directly introduce the water pressurized by the water pump into the beverage making chamber, or into the heater, and then into the beverage making chamber.

The advantageous effects obtained by using the above-mentioned technical solution are as follows. Compared with the prior art, the refrigerator according to the present invention has a water dispenser capable of making a beverage, such as coffee, milk tea, or the like, based on the demands from the user, thereby satisfying diverse drinking demands from people and solving the problem of the single function of the existing refrigerator.

Another object of the present invention is to provide a new refrigerator capable of making a plurality of beverages according to user needs, which is manufactured conveniently and facilitates the cost control.

In order to solve the above-mentioned technical problem, the present invention may also adopt the following technical solution: a refrigerator, including a cabinet, a door of the cabinet, openably connected to the cabinet, and a water dispenser provided at the door, the water dispenser includes a water tank, a drain path connected with the water tank, a beverage making chamber provided at one end of the drain path away from the water tank, and a dispenser for the user to get the beverage, the beverage making chamber is communicated with the dispenser, the water dispenser further includes an integration module provided between the water tank and the beverage making chamber, the integration module including any one, two or all of a flow meter, a water pump, and a heater.

As a further improved technical solution of the present invention, the integration module includes a flow meter and a water pump provided on the drain path, the integration module is communicated with a high pressure water outlet pipe which supplies a determined amount of high pressure water to the beverage making chamber.

As a further improved technical solution of the present invention, the integration module further includes a heater provided between the water pump and the beverage making chamber, and the integration module supplies a determined amount of high pressure water to the beverage making chamber.

As a further improved technical solution of the present invention, the integration module is also communicated with a high temperature and high pressure water outlet pipe which communicates the heater with the beverage making chamber.

As a further improved technical solution of the present invention, the integration module includes a flow meter, a water pump and a heater which are connected in sequence, the integration module has a high pressure water outlet pipe and a high temperature and high pressure water outlet pipe, and the high pressure water outlet pipe is connected to the water pump, and the high temperature and high pressure water outlet pipe is connected to the heater.

As a further improved technical solution of the present invention, the refrigerator further includes a selector provided at one end of the high temperature and high pressure water outlet pipe away from the heater, the selector having two outlets, one of which is in pipe connection with the beverage making chamber, and the other of which is connected to the dispenser.

As a further improved technical solution of the present invention, the integration module includes an upper cover and a lower cover which are detachably connected with each other, and the flow meter, the water pump and the heater are received between the upper cover and the lower cover.

As a further improved technical solution of the present invention, the dispenser is recessed at the door, and the integration module is provided at a rear surface of the dispenser.

As a further improved technical solution of the present invention, the beverage making chamber is provided therein with a capsule support for receiving a beverage powder capsule and a capsule piercing structure for piercing the capsule.

The advantageous effects obtained by using the above-mentioned technical solution are as follows. The refrigerator with the integration module may warm, pressurize the beverage and/or adjust the concentration of the beverage when the beverage is prepared, so that the user may make beverages of various flavors as required, and the diversification of drinking functions of the refrigerator is realized. Also, the integration module is easy to transport and assemble, thereby improving the productivity of the refrigerator.

Another object of the present invention is to provide a new refrigerator capable of supplying hot water and providing a good heat dissipation environment for a water heating device.

In order to solve the above-mentioned technical problem, the present invention may also adopt the following technical solution: a refrigerator, including a cabinet, a door of the cabinet, openably connected to the cabinet, and a hot water supply device including a water tank connected with an external water source, a drain path connected with the water tank, a heater for heating the water in the drain path, and a dispenser provided with a hot water outlet, the dispenser recessed at the door, including an receiving portion provided on a side opposite to the hot water outlet, and the heater received in the receiving portion.

As a further improved technical solution of the present invention, the door is provided therein with a foam layer, and the receiving portion is provided between the foam layer and the dispenser.

As a further improvement of the present invention, the hot water outlet is provided on a surface of the dispenser, and the receiving portion is provided adjacent to the hot water outlet at a rear surface of the dispenser opposite to the surface.

As a further improved technical solution of the present invention, the dispenser is provided with a water tray opposite to the hot water outlet, and the receiving portion is provided at a rear surface of the water tray.

As a further improved technical solution of the present invention, the receiving portion is provided with a heat dissipation hole for dissipating heat from the heater.

As a further improved technical solution of the present invention, the heater is stuck in the receiving portion.

As a further improved technical solution of the present invention, the hot water supply device further includes a beverage making chamber provided between the heater and the dispenser, and the heater has two water outlets, one of which is connected with the beverage making chamber, and the other of which is connected with the hot water outlet of the dispenser.

As a further improved technical solution of the present invention, the dispenser is provided with a beverage outlet connected with the beverage making chamber.

As a further improvement of the technical solution of the present invention, the drain path is further provided therein with a flow meter and a water pump between the water tank and the heater.

The advantageous effects obtained by using the above-mentioned technical solution are as follows. Compared with the prior art, the heater is no longer provided inside the door, but at the rear surface of the dispenser, thereby avoiding the influence of the filling of foam materials on the heat dissipation of the heater, which contributes to prolonging the service life of a heat sink, eliminates potential risks brought by the hot water supply device to the refrigerator, and reduces the maintenance cost of the refrigerator.

Another object of the present invention is to provide a new refrigerator at least capable of supplying room temperature beverages and ice water to a user, and meeting the most frequent drinking demand of the user.

In order to solve the above-mentioned technical problem, the present invention may also adopt the following technical solution: a refrigerator, including a cabinet, a door of the cabinet, openably connected to the cabinet, and a water dispenser provided at the door, the water dispenser includes a first water tank connected with an external water source, a first water passage connected with the first water tank, a beverage making chamber provided at one end of the first water passage away from the first water tank, and a dispenser connected with the beverage making chamber and having a water outlet; the water dispenser further includes a second water tank connected with the external water source and a second water passage connected with the second water tank, the second water passage is also connected with the dispenser, and the second water tank is provided in a refrigerating compartment or an ice making module.

As a further improvement of the technical solution of the present invention, the first water passage is provided with a flow meter, and the flow meter is provided between the first water tank and the beverage making chamber, to control a quantity of water intake of the beverage making chamber.

As a further improved technical solution of the present invention, the first water passage is provided with a heater, and the heater is provided between the first water tank and the beverage making chamber, for supplying hot water to the beverage making chamber.

As a further improvement of the technical solution of the present invention, the first water passage further includes a hot water branch insulated from the beverage making chamber, the hot water branch communicates the heater with the hot water outlet, and the hot water outlet is provided on the dispenser.

As a further improved technical solution of the present invention, the first water passage is further provided with a water pump, and the water pump is provided between the first water tank and the heater, for supplying pressurized water to the heater.

As a further improvement of the technical solution of the present invention, the first water passage further includes a room temperature beverage branch insulated from the heater, and the room temperature beverage branch communicates with the water pump with the beverage making chamber.

As a further improved technical solution of the present invention, the first water passage is provided with a water pump, and the water pump is provided between the first water tank and the beverage making chamber, for supplying pressurized water to the beverage making chamber to make a room temperature beverage.

As a further improved technical solution of the present invention, the first water passage is further provided with a water heater, and the water heater is provided between the water pump and the beverage making chamber to heat the pressurized water.

As a further improvement of the technical solution of the present invention, the water dispenser further includes a filter provided between the external water source as well as the first water tank and the second water tank to purify the water.

The advantageous effects obtained by using the above-mentioned technical solution are as follows. The refrigerator according to the present solution at least has two water passages, in which the first water passage supplies a room temperature beverage, and the second water passage supplies ice water, so that the user may obtain at least the room temperature beverage and the ice water through the dispenser, which solves the most common and frequent drinking demand of users, and provides a further support for the technology of functional diversification of the refrigerator.

DETAILED DESCRIPTION

Figure 1:
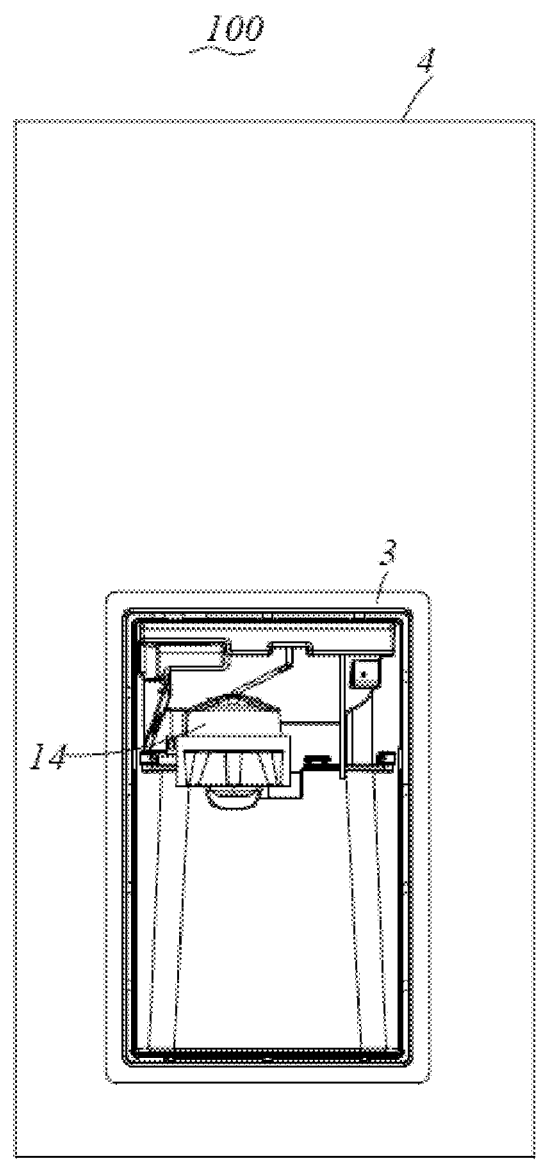
FIG. 1 is a front view of a water dispenser of a refrigerator according to a preferred first embodiment of the present invention.

The present invention will be described below in detail in combination with specific embodiments illustrated in drawings. However, these embodiments have no limitations on the present invention, and any transformations of structure, method, or function made by persons skilled in the art according to these embodiments fall within the protection scope of the present invention.

In drawings of the invention, some of the dimensions of the structure or portion may be enlarged relative to those of other structures or portions for ease of illustration and thus are merely used to illustrate the basic structure of the subject matter of the present invention.

The terms expressive of spatial relative positions, such as "upper", "above", "lower", "below", or the like herein are used to describe the relationship of a unit or feature relative to another unit or feature in the drawings, for the purpose of illustration and description. Terms expressive of the spatial relative positions are intended to include different orientations of the device in use or operation other than the orientations shown in the drawings. For example, if the device in the drawings is turned over, the units that are described to be located "below" or "under" other units or features are "above" other units or features. Therefore, the exemplary term "below" may include both the "above" and "below" orientations. The device may be oriented (rotated by 90 degrees or other orientations) in other ways, correspondingly explaining the expressions related to the space herein. Also, it should be understood that although the terms of first, second, etc. may be used herein to describe various elements or structures, these described objects should not be limited by them. These terms are merely used to distinguish these described objects.

The present invention discloses a refrigerator including a cabinet with a refrigerating compartment and a door openably connected to the cabinet. The door may be open pivotally or in a sliding manner.

In order to meet the increasingly diverse drinking demands from the user, in the embodiments according to the present invention, the refrigerator includes a water dispenser 100 capable of making room temperature beverages, high temperature beverages, hot water, and ice water. In the preferable embodiments of the present invention, the water dispenser 100 is a module which may be integrally embedded in the door, including an outer casing 4, referring to FIG. 1.

Figure 2:
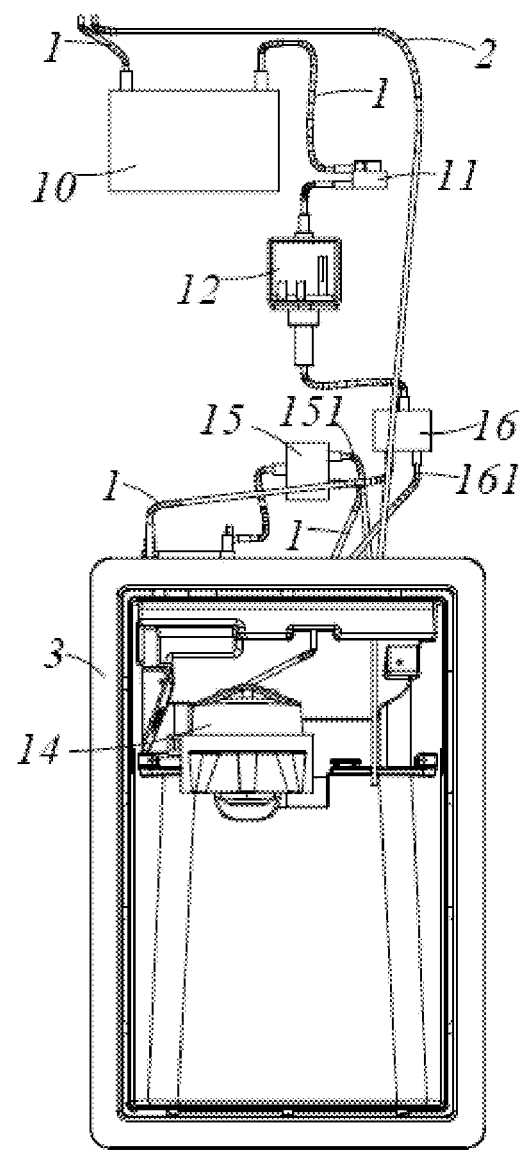
FIG. 2 is a schematic diagram of the water dispenser in FIG. 1 with an outer casing 4 omitted.

Referring to FIG. 2, for convenience of description, the outer casing 4 is omitted, and the water dispenser 100 includes a water tank connected with an external water source, for storing and supplying drinking water to a drain path connected with the water tank. In the present embodiment, the water dispenser 100 includes a first water tank 10 and a second water tank, wherein the first water tank 10 is provided in the door for the water dispenser 100 to make hot beverages, warm beverages and hot water, and the second water tank is provided in the refrigerating compartment to keep the water temperature at a relatively low temperature by using cold air of the refrigerating compartment, for the user to take ice water. Certainly, the second water tank may also be provided in an ice making module of the door, the ice making module has separate air supply and return ducts independent of the refrigerating compartment, and the second water tank may be provided in the ice making module to get ice water rapidly.

In order to obtain relatively pure drinking water, the water dispenser 100 according to the present embodiment further includes a filter provided between an external water source as well as the first water tank 10 and the second water tank, such that the water flowing to the first water tank 10 and the second water tank has been filtered and purified.

Referring to FIGS. 1 and 2, the water dispenser 100 further includes a dispenser 3 provided at a tail end of the drain path, the dispenser 3 is provided on the door, on which a water outlet is provided, for the easy access to beverages. The dispenser 3 is recessed on the door, and is provided thereon with a water outlet and a water tray 31 provided opposite to the water outlet.

Figure 3:
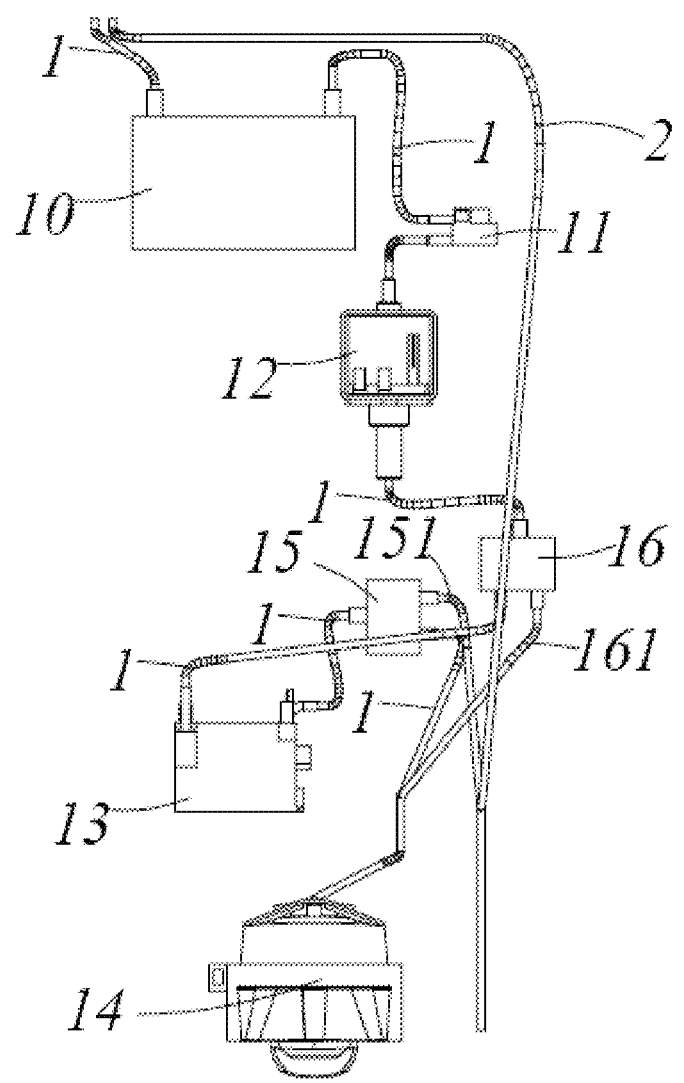
FIG. 3 is a schematic diagram of a drain path of the water dispenser in FIG. 1.

Referring to FIG. 3, corresponding to the first water tank 10 and the second water tank, the drain path in the water dispenser 100 includes a first water passage 1 connected with the first water tank 10, and a second water passage 2 connected with the second water tank. The dispenser 3 is provided with a water outlet communicated with the second water passage 2, so that the ice water stored in the second water tank flows out of the water outlet through the second water passage 2, for the easy access to beverages at any time.

Figure 4:
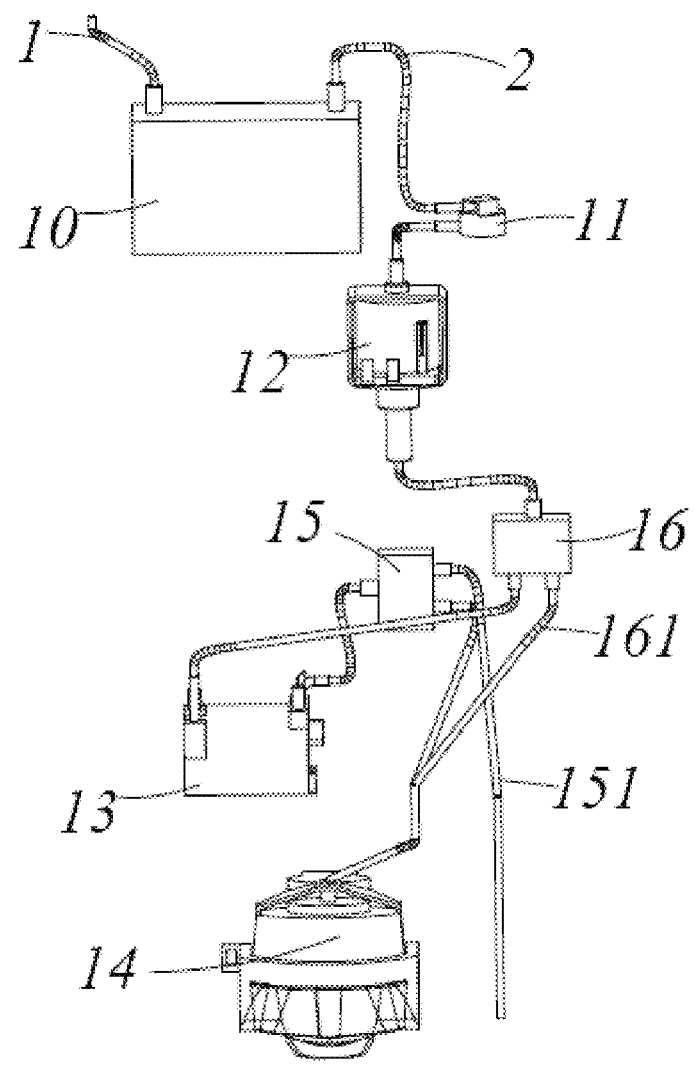
FIG. 4 is a schematic diagram of a first water passage of the drain path in FIG. 3.

Referring to FIG. 4, comparatively speaking, the first water passage 1 is more complicated than the second water passage 2 due to its function of making beverages. Specifically, the first water passage 1 is at least connected with the beverage making chamber 14. In the present embodiment, the beverage making chamber 14 is provided at one end of the first water passage 1 away from the first water tank 10, and the beverage making chamber 14 has an outlet communicated with a beverage outlet provided on the dispenser 3.

The beverage making chamber 14 is provided therein with a capsule support for receiving beverage powder capsules and a capsule piercing structure for piercing the capsule. The beverage powder capsule is a commercially available capsule containing beverage powder, which is disposable, such as a coffee capsule, a tea powder capsule, or a capsule of other juice powder. In the present invention, the coffee capsule is taken as an example. The capsule piercing structure is operatively movable to pierce a coffee capsule received in the capsule support in response to a user's instruction for making coffee, and then is reset to wait for a next piercing instruction. After each coffee making, the used coffee capsule may be removed from the capsule support and replaced with a new coffee capsule. The capsule piercing structure is commonly conventional in the existing capsule coffee maker, and thus may be understood by referring to the prior art, and is not repeated herein.

As such, the first water passage 1 may at least make a room temperature beverage, such as a room temperature coffee. Certainly, in order to make the beverage taste better, the user may be provided with much choice, such as the temperature for making coffee, thickness of coffee, and brewing pressure and thus the refrigerator with the water dispenser 100 according to the present invention will gain the popularity among more users.

In the second embodiment of the present invention, the water dispenser 100 further includes an integration module 17 provided between the first water tank 10 and the beverage making chamber 14, the integration module 17 including any one, two or all of a flow meter 11, a water pump 12 and a heater 13. The integration module 17 is provided at a rear surface of the dispenser 3.

Figure 5:
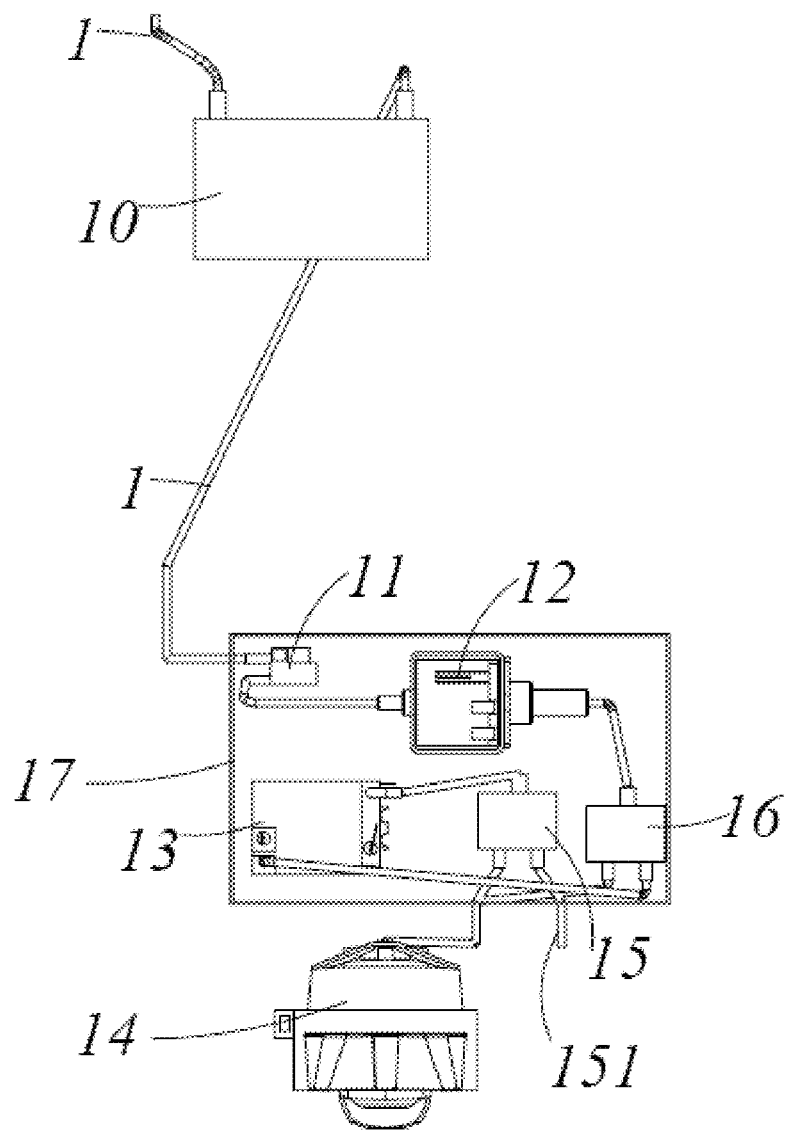
FIG. 5 is a schematic diagram of a water dispenser according to a second embodiment of the present invention.

Referring to FIG. 5, the flow meter 11 is provided at the outlet of the first water tank 10, for calculating the amount of drinking water flowing out of the first water tank 10 in real time to respond to a demand of the amount of water required for making coffee from the user. The demand information on the thickness of coffee from the user may be input through a user interface provided on the dispenser 3. After receiving the demand information, the user interface immediately generates a representative signal of the demand information, and the controller also provided in the dispenser 3 controls the water dispenser 100 according to the representative signal.

For example, when the concentration information required by the user is received, such as the information on the amount of water for brewing, the user interface generates a representative signal of the information on the amount of water, and the controller controls the flow meter 11 to be ON or OFF based on the representative signal. When the amount of water flowing through the flow meter 11 reaches a target value, the controller controls the flow meter 11 to cut off the first water passage 1, and only allows an appropriate amount of water to enter the beverage making chamber 14, thereby satisfying the user's demand for the beverage concentration.

Certainly, the user interface may also receive other demand information of the user for the water dispenser 100, such as selections of the brewing temperature and a brewing pressure, and generate a corresponding representative signal, so that the controller performs corresponding adjustment and control based on the representative signal.

In the preferable embodiment according to the present invention, the integration module 17 further includes a water pump 12 provided on the first water passage 1. The water pump 12 is provided behind the flow meter 11 and in front of the beverage making chamber 14, for pressurizing the drinking water to improve the pressure for making beverages. The arrangement of the water pump 12 facilitates making the beverage taste better. Particularly, the perfect espresso may be made through the water pump 12. The integration module 17 is communicated with a high pressure water outlet pipe, one end of which is connected with the water pump 12 and the other end of which is connected with the beverage making chamber 14. In the present embodiment, the water passage where the high pressure water outlet pipe connected with the beverage making chamber 14 is located is the branch of the first water passage 1, i.e., the room temperature beverage branch 161. The room temperature beverage branch 161 bypasses the heater 13 (or is insulated with the heater 13) and is directly communicated with the water pump 12 and the beverage making chamber 14. What flows from the outlet of the dispenser 3 via the room temperature beverage branch 161 is a room temperature and pressurized beverage, which meets the demands of drinking water from most young people.

In the present preferable embodiment, the integration module 17 further includes a heater 13 provided between the water pump 12 and the beverage making chamber 14. The integration module 17 is also communicated with the high temperature and high pressure water outlet pipe which communicates the heater 13 with the beverage making chamber 14, to supply a determined amount of high temperature and high pressure water to the beverage making chamber 14.

As described above, the high pressure water outlet pipe connecting the water pump 12 with the beverage making chamber 14 is the room temperature beverage branch 161, and the first water passage 1, as the main water passage, sequentially goes through the flow meter 11, the water pump 12, and the heater 13. In other words, the water flowing through the water pump 12 may keep flowing to the heater 13 along the first water passage 1, or may directly enter the beverage making chamber 14 along the room temperature beverage branch 161, i.e., the high pressure water outlet pipe.

In order to conveniently control the high pressure water flowing out of the water pump 12 to flow into the heater 13 or the beverage making chamber 14, the water dispenser 100 according to the present invention further includes a selector controlled by the above-mentioned controller, and the controller performs the corresponding operation based on the representative signal of the demand information of the user generated by human-computer interaction of the human interface. Preferably, the selector is a solenoid valve. Further, the selector is a two-way valve, i.e., with one water inlet and two water outlets, the two water outlets respectively guiding the drinking water to different paths.

The water dispenser 100 according to the present embodiment includes two selectors, i.e., a first selector 15 and a second selector 16. The second selector 16 is provided between the water pump 12 and the heater 13, for selectively controlling the direct introduction of the water pressurized by the water pump 12 into the beverage making chamber 14 (the room temperature beverage branch 161) or into the heater 13 (the first water passage 1).

Referring to FIG. 5, two water passages are further included between the heater 13 and the beverage making chamber 14. One of the two water passages is the first water passage 1 as the main water passage, through which, the high temperature and high pressure water outlet pipe is communicated with the beverage making chamber 14, thereby brewing a high temperature beverage with a rich taste, such as hot espresso; the other is a hot water branch 151; the high temperature and high pressure water outlet pipe is communicated with the heater 13 and the hot water outlet of the dispenser 3, thereby providing the direct access to the hot water for the user, and providing the user with another pure choice. In order to conveniently select the above-mentioned water passages, the first selector 15 is provided between the heater 13 and the beverage making chamber 14. Like the above-mentioned second selector 16, the first selector 15 includes one water inlet and two water outlets. One end of the first selector 15 is connected with the water outlet pipe of the heater 13 through the water inlet, and the other end thereof is in pipe connection with the beverage making chamber 14 and the dispenser 3 through the water outlet respectively, for selectively controlling the introduction of the water heated by the heater 13 into the beverage making chamber 14, or direct flow from the hot water outlet provided at the dispenser 3.

To sum up, the integration module 17 includes a flow meter 11, a water pump 12, and a heater 13 which are sequentially connected therewith. One end of the integration module 17 is connected with the first water tank 10, and the other end thereof may inject the high temperature and high pressure water into either the beverage making chamber 14 or the hot water outlet through the first selector 15, and inject the high pressure water into the beverage making chamber 14 through the second selector 16. In the present embodiment, the high pressure water pipe and the high temperature and high pressure water pipe leading to the beverage making chamber 14 are finally combined into one water pipe, and the beverage flows from the beverage making chamber 14 through the same beverage outlet, i.e., the hot beverage and the room temperature beverage both flow from the same beverage outlet, which makes it easy to control a width space occupied by the dispenser 3.

In addition, referring back to FIG. 3, the second water passage 2 and the hot water branch 151, the hot water of which is directly injected into the hot water outlet of the dispenser 3 through the first selector 15, are finally combined into one water pipe and the beverage flows out of the other water outlet. The beverage and the purified water are exported from different outlets, so as to avoid tainting the purified water due to residual beverages.

In the foregoing description, the dispenser 3 includes at least two water outlets, one for the beverage to flow from the beverage making chamber 14 and the other for the hot water and ice water to flow out. The selection of different temperatures for the same outlet is implemented by inputting the demand information through the user interface provided on the dispenser 3, and then controlling the corresponding selector by the controller based on the representative signal of the demand information. Certainly, beverages with different temperatures may also flow out of different outlets. In other words, four outlets for a room temperature beverage, a high temperature beverage, hot water, and ice water, may also be provided for separate access.

In the foregoing description, the integration module 17 integrates the flow meter 11, the water pump 12, the heater 13 and the first and second selectors 15 and 16. Certainly, the integration module 17 may also be provided therein only with any one of the flow meter 11, the water pump 12 and the heater 13, or only the flow meter 11 and the heater 13, or only the water pump 12 and the heater 13.

Figure 6:
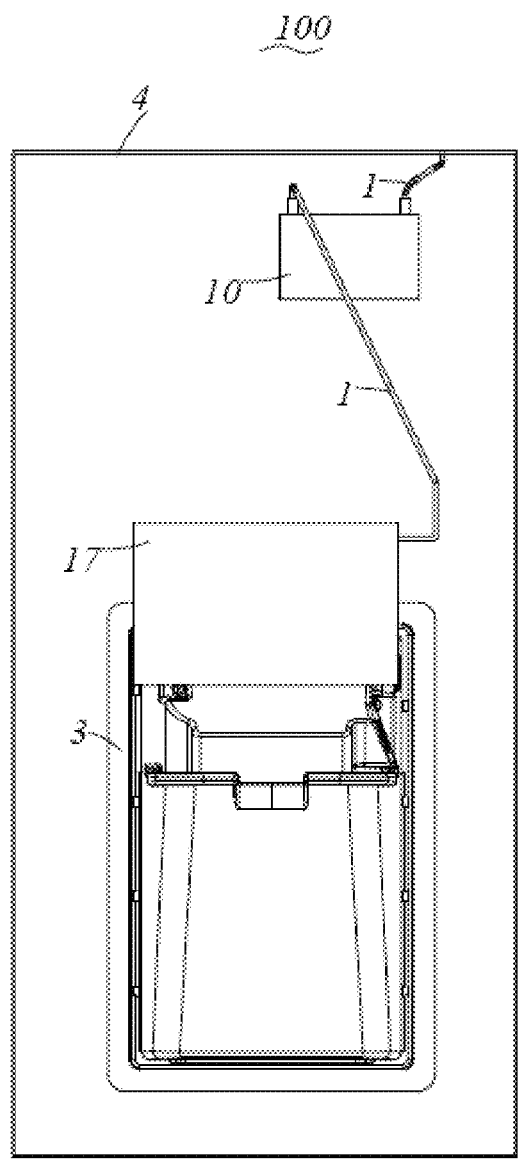
FIG. 6 is a rear view of the water dispenser in FIG. 5.

Referring to FIG. 6, the integration module 17 includes two housings detachably connected with each other, such as an upper cover and a lower cover, between which the flow meter 11, the water pump 12 and the heater 13 are received. Specifically, the integration module 17 is provided with a limiting structure in the housing to properly locate the flow meter 11, the water pump 12 and the heater 13, so as to avoid mutual interference. The arrangement of the integration module 17 facilitates the combination of optimal functions. The integration module 17 may be sold and transported as a separate module, facilitates the assembly operation of the refrigerator as a whole, improves the production efficiency of the refrigerator, and lowers human costs.

As shown in FIGS. 2 to 4, in the first embodiment of the present invention, the water dispenser 100 is not provided with the integration module 17. In the present embodiment, the flow meter 11, the water pump 12 and the heater 13 are separately provided and are in series connection one another through the drain path. Since the drain path is connected in the same manner as in the second embodiment, the water dispenser 100 without the integration module 17 may refer to the specific description in the second embodiment, and will not be repeated herein.

As described above, the water dispenser 100 may be embedded as a whole into the door of the refrigerator, and the foam layer is provided in the door of the refrigerator to insulate the refrigerating compartment. The water dispenser 100 is provided between the surface of the door and the foam layer to prevent the first water tank 10 from being too cold, while allowing the heater 13 to dissipate heat.

Figure 7:
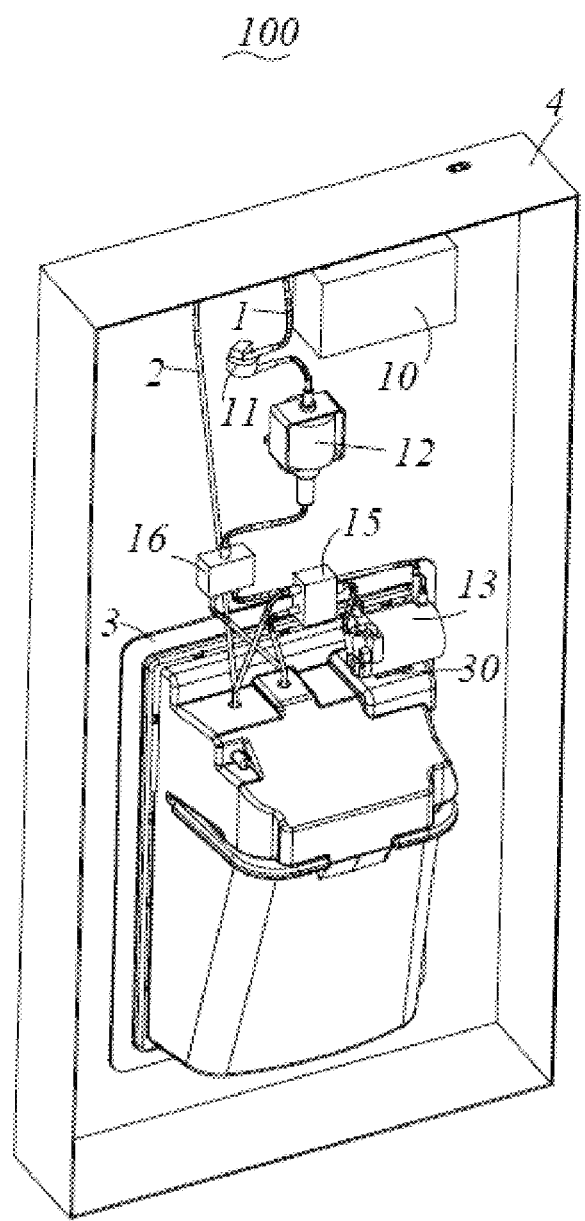
FIG. 7 is a rear view of the water dispenser in FIG. 1.
Figure 8:
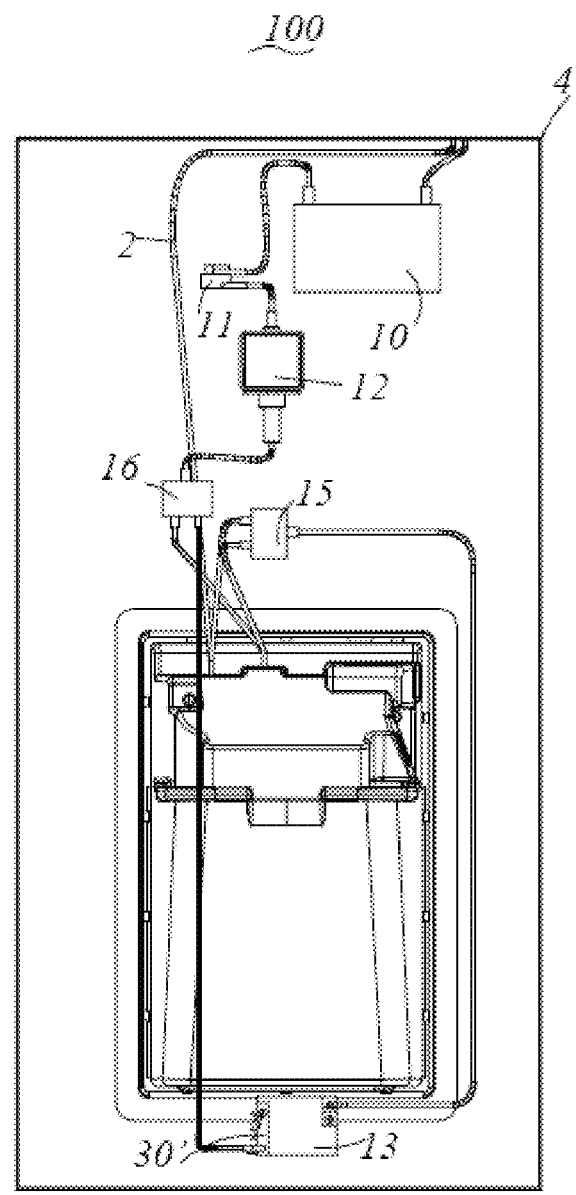
FIG. 8 is a rear view of a water dispenser according to a third embodiment of the present invention.

Referring to FIGS. 7 and 8, in order to improve the heat dissipation effect of the heater 13, the dispenser 3 is provided with a receiving portion 30 for receiving the heater 13. The receiving portion 30 is provided at a rear surface of the dispenser 3, i.e., the side opposite to the hot water outlet. The receiving portion 30 is provided with a limiting structure for the heater 13 to be stuck in the receiving portion 30. The limiting structure has various well-known embodiments, which are not enumerated herein.

With respect to the position of the receiving portion 30, two embodiments are described in the present invention. Referring to FIG. 7, the hot water outlet is provided on a surface of the dispenser 3, and the receiving portion 30 is provided adjacent to the hot water outlet at a rear surface of the dispenser 3 opposite to the surface.

Referring to FIG. 8, in another embodiment, the receiving portion 30' is provided at a rear surface of the water tray 31 of the dispenser 3, wherein the water tray 31 is opposed to the hot water outlet. In other words, the hot water outlet is provided above the surface of the dispenser 3, and the water tray 31 is provided below the surface of the dispenser 3. In two different embodiments, the receiving portion 30' is provided at a rear surface of the hot water outlet and a rear surface of the water tray 31 respectively.

Preferably, the receiving portions 30, 30' are provided with heat dissipation holes for dissipating heat from the heater 13. There are various implementations regarding the number and arrangement of the heat dissipation holes, and details are not repeated herein again.

To sum up, the water dispenser 100 according to the present invention supplies various beverages, and may meet the drinking demands from different family members in one family or one family member at different stages, which greatly enhances the usability of the refrigerator, diversifies the function of the refrigerator, greatly improves the user experience, and makes significant improvements compared with the prior art.

In addition, on this basis, effective optimal measures are taken to solve the problem of heat dissipation of the heater 13, which improves the performance of the water dispenser 100, prolongs the service life of the heater 13 and the refrigerator, and reduces maintenance costs. At the same time, the design of the integration module 17 further reduces the assembly complexity of the water dispenser 100, improves the overall assembly efficiency of the refrigerator, and saves the manufacturing costs.

It should be understood that although the present specification is described based on embodiments, not every embodiment contains only one independent technical solution. Such a narration way of the present specification is only for the sake of clarity. Those skilled in the art should take the present specification as an entirety. The technical solutions in the respective embodiments may be combined properly to form other embodiments which may be understood by those skilled in the art.

A series of the detailed descriptions set forth above is merely specific description of feasible embodiments of the present invention, and is not intended to limit the protection scope of the present invention. Equivalent embodiments or modifications made within the spirit of the present invention shall fall within the protection scope of the present invention.

What is claimed is:

1. A refrigerator, comprising a cabinet, a door of the cabinet, openably connected to the cabinet, and a water dispenser provided at the door, wherein the water dispenser comprises a water tank, a drain path connected with the water tank, a beverage making chamber provided at one end of the drain path away from the water tank, and a dispenser for the user to take the beverage, the beverage making chamber is communicated with the dispenser, the water dispenser further comprises an integration module provided between the water tank and the beverage making chamber, the integration module comprising any one, two or all of a flow meter, a water pump, and a heater;

wherein the integration module comprises a flow meter, a water pump and a heater which are connected in sequence, the integration module has a high pressure water outlet pipe and a high temperature and high pressure water outlet pipe, and the high pressure water outlet pipe is connected to the water pump, and the high temperature and high pressure water outlet pipe is connected to the heater.

2. The refrigerator according to claim 1, wherein the integration module comprises a flow meter and a water pump provided on the drain path, the integration module is communicated with a high pressure water outlet pipe which supplies a determined amount of high pressure water to the beverage making chamber.

3. The refrigerator according to claim 2, wherein the integration module further comprises a heater provided between the water pump and the beverage making chamber, and the integration module supplies a determined amount of high temperature and high pressure water to the beverage making chamber.

4. The refrigerator according to claim 3, wherein the integration module is also communicated with a high temperature and high pressure water outlet pipe which communicates the heater with the beverage making chamber.

5. The refrigerator according to claim 1, wherein the refrigerator further comprises a selector provided at one end of the high temperature and high pressure water outlet pipe away from the heater, the selector having two outlets, one of which is in pipe connection with the beverage making chamber, and the other of which is connected to the dispenser.

6. The refrigerator as claimed in claim 1, wherein the integration module comprises an upper cover and a lower cover which are detachably connected with each other, and the flow meter, the water pump and the heater are received between the upper cover and the lower cover.

7. The refrigerator according to claim 5, wherein the dispenser is recessed at the door, and the integration module is provided at a rear surface of the dispenser.

8. The refrigerator according to claim 1, wherein the beverage making chamber is provided therein with a capsule support for receiving a beverage powder capsule and a capsule piercing structure for piercing the capsule.

* * * * *